Figure 1:
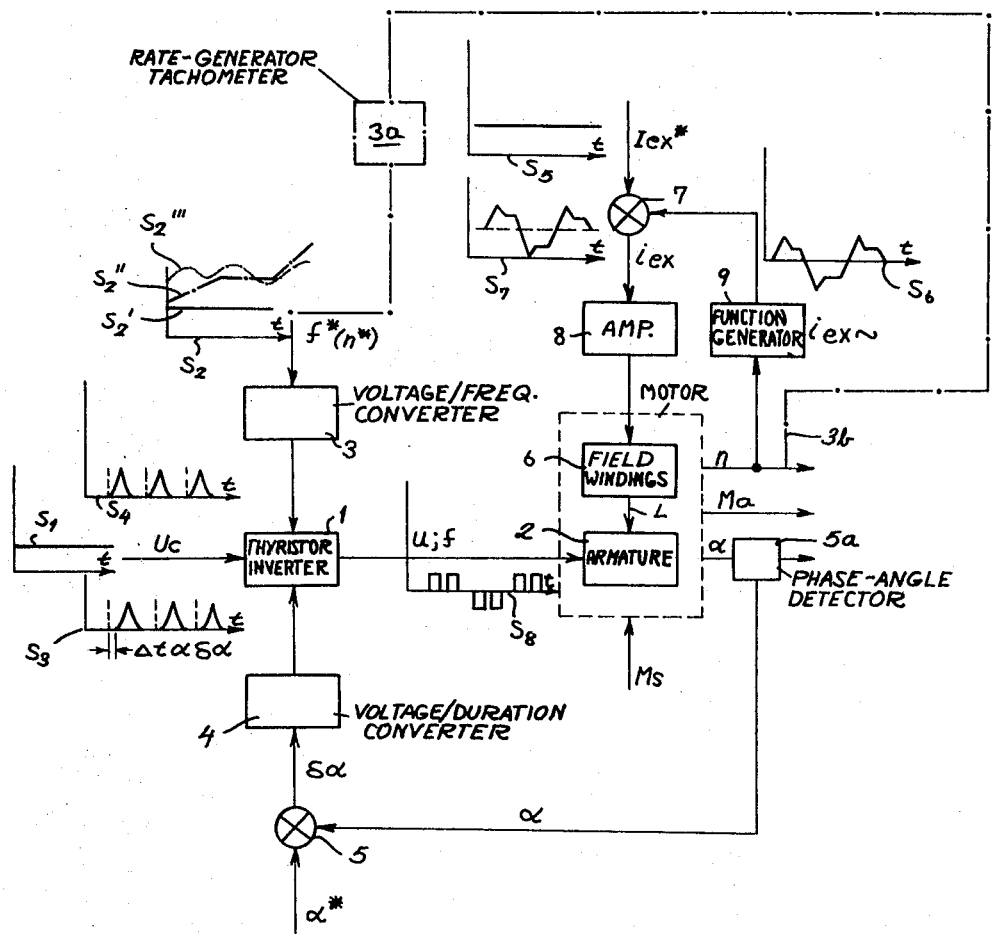

United States Patent

[11] 3,612,970

| [72] | Inventor | Eugen Ladislay Sofan<br>Bucharest, Romania |
|---|---|---|
| [21] | Appl. No. | 68,155 |
| [22] | Filed | Aug. 31, 1970 |
| [45] | Patented | Oct. 12, 1971 |
| [73] | Assignee | Ministerul Industriei Constructiilor de Masini<br>Bucuresti, Romania |
| [32] | Priority | Feb. 13, 1967 |
| [33] | | Romania |
| [31] | | 53104 |
| | | Continuation-in-part of application Ser. No. 704,941, Feb. 12, 1968, now abandoned. |

[54] AUTOMATIC-CONTROL SYSTEM FOR THE ANGULAR SPEED OF A SYNCHRONOUS MOTOR
10 Claims, 2 Drawing Figs.

[52] U.S. Cl. .................................................. 318/175,
318/171, 318/188
[51] Int. Cl. .................................................. H02p 5/28
[50] Field of Search .......................................... 318/138,
174, 175, 171, 188

[56] References Cited
UNITED STATES PATENTS

| 2,881,377 | 4/1959 | Apa et al. ................. | 318/175 |
| 3,234,445 | 2/1966 | Calvert ..................... | 318/175 |
| 3,238,432 | 3/1966 | Amberger ................. | 318/175 |
| 3,254,285 | 6/1966 | Jötten ....................... | 318/138 |

*Primary Examiner*—Gene Z. Rubinson
*Attorney*—Karl F. Ross

ABSTRACT: A synchronous motor is driven from a forced-communtation thyratron-type inverter whose control inputs are provided by a voltage/frequency converter and a voltage/duration converter responsive to the motor speed and phase relationships for establishing the ignition and cutoff of the power pulses.

AUTOMATIC-CONTROL SYSTEM FOR THE ANGULAR SPEED OF A SYNCHRONOUS MOTOR

The present application is a continuation-in-part of my application Ser. No. 704,941 filed Feb. 12 1968 and now abandoned.

The present invention relates to an automatic-control system for the angular speed of a synchronous electric motor and, more particularly, to a motor-speed controller using forced commutation of a thyratron-type inverter to provide power pulses to the motor.

Numerous Motor control systems have been provided heretofore for the regulation and maintenance of a predetermined motor speed and to enable adjustment of the speed of a synchronous electric motor. Such systems have included arrangements whereby a controllable power inverter is provided between a line-current source and a motor winding, the power inverter being located between a rectifier capable of converting the common alternating current of the line to direct current such that the motor is fed with pulses of a duration, pulse frequency and spacing established by the cutoff and ignition times of the electronic devices of the inverter. Typical of such inverters are those using steep wave front switching devices such as thyratrons and the corresponding semiconductive elements, e.g., power thyristers. Such switching devices are designated hereinafter as thyratron-type electronic switches.

Most frequently, self-excited arrangements have been provided in which the inverter functions in part as an oscillator and includes internal feedback determining at least one parameter of the power pulses. Speed-control devices have often been provided, especially for low-power motors, which include some of the principles set forth above, but wherein the power pulses are constituted by the alternating-line sinusoid, suitably chopped or limited. High-power systems, however, have concentrated upon the use of inverters of the aforedescribed type. Such self-commutating inverters may also be described as frequency converters, if viewed with the usual rectifier, since an alternating line current of one frequency serves as the input while power pulses of another frequency constitute the output.

Attempts have been made to solve this problem by providing damping windings, the function of which is to restrict oscillation or damp out the oscillation relatively rapidly. This proposal does not, however, prevent modification of the load angle or motor (power phase angle) or of the phase angle of its angular velocity.

To obviate this difficulty, it has been suggested to provide a phase angle control in which reference pulses are compared with pulses for displacing the rotor and producing a control signal acting upon the excitation current of the motor to maintain this phase angle when there is a tendency to variation thereof because of variation of the mechanical torque. With this system there is nevertheless no bilateral or reciprocal correlation of the phase angle with the corresponding signals. Thus, it is difficult to maintain a motor operation with a predetermined relationship of phase and load angle and with other substantially constant parameters.

The rotor therefore represents an action channel, using the terminology of control systems, of considerable electromagnetic inertia and incapable of rapid response to rapid variations in mechanical or load torque. It is not sufficiently satisfactory to provide a feedback loop of classical type since this does not preclude an initial phase angle difference as is required for the commencement of the regulation process.

It is, therefore, the principal object of the present invention to provide an improved control system for electric motor in which the aforedescribed disadvantages can be obviated.

Another object of the present invention is to provide an improved automatic-control system for the angular speed of an electric motor which enables accurate and readily adjusted speed control without phase-angle changes of the type which have characterized earlier efforts along these lines.

These objects and others which will become apparent hereinafter are obtained, in accordance with my present invention, by carrying forth principles originally set forth in my earlier application mentioned above, and employing a synchronous motor whose armature is energized by power pulses derived from a thyratron-type of inverter, i.e., a Class E thyristor inverter. Inverters of this type are described at pages 226, 259 ff of General Electric SCR Manual, Fourth Edition, 1967 (General Electric Company, Syracuse N.Y.).

In accordance with the present invention, the DC/AC thyristor inverter has, at its power input, a direct current source, preferably a noncontrolled or static rectifier connected between the power or line (alternate current) source and the principal electrodes of the thyratron switching devices and in series with the load (armature windings) and these switching devices.

The invention resides in the provision of two control chains for triggering the switching devices and for inducing a conductive mode of the latter for terminating this mode, the control chains serving to commute the inverter and constituting feedback loops between the output of the system and its input. A first chain, referred to hereinafter as a voltage/frequency chain, has an output of a pulsed nature and serves to trigger the thyristor elements into conductive operation to establish, in accordance with the pulse cadence, a means value of the angular velocity of the mode. The latter chain, moreover, comprises a voltage/frequency signal converter having as an input a direct current reference voltage. The first chain, via a separate branch for the identical branch, operates to establish the mean value of the armature current of the motor in response to the output voltage of the inverter, the input of the voltage/duration signal converter constituting a direct current for establishing the duration of conduction of the thyratron devices of the inverter by controllably delaying the extinction pulses of the thyristors relative to the corresponding ignition pulses.

A second control chain or feedback loop of the invention establishes the excitation current of the motor stator and includes a summing element (summator) coupled with the indicator (field winding) of the motor with the aid of an amplifier. The summator, according to the present invention, produces a signal proportional to the algebraic sum of several parameters entering into a determination of this current. One such component is generated by a direct current voltage source coupled to the summator element. The control chains are so constructed and arranged that the second chain, delivering the excitation current to the stator windings, establishes the magnitude of the phase angle of the angular speed of the motor in accordance with modulation of the excitation current.

The modulation is accomplished by a function generator coupled with the summator and generating a current of variable amplitude and, therefore, an envelope representing adjustable form, amplitude and phase, but with a period determined by the rotary speed of the motor. This latter control is realized by a feedback signal applied in the form of a voltage to the input of the generator.

According to the principles of the present invention, therefore, the first control chain delivers the feed voltage and establishes the frequency for the armature of the motor and also compensates for residual imperfections of the modulation of the motor excitation In more specific terms, therefore, the invention comprises a synchronous motor having a stator and an armature, the stator being provided with an excitation winding, while the armature is formed with the usual armature winding.

The excitation-control loop of the present invention comprises means responsive to the angular velocity of the motor shaft and, therefore, the load-driving shaft to produce a periodic signal whose period is a function of motor speed but other parameters of which are variable, serving as at least one input to an algebraic summer in the form of a periodic excitation current. Another input to the summer is an analog voltage which may be set at will and therefore determines approximately the mean value of the periodic excitation current which is controlled in accordance with the speed of the motor shaft. To this end a rate generator may be provided to form an output proportional to angular velocity of the motor. The two inputs to the summator according to this invention, produce an output fed by an amplifier to the excitation winding which is inductively coupled to the phase-angle control chain through the airgap between the stator and the rotor.

With the present invention, the phase angle of the angular speed of the motor is adjusted to the desired value with the reference voltage introduced via the feedback loop of this angle.

This loop acts through the armature of the motor, i.e. through channel with reduced electromagnetic inertia. Besides, this feedback loop has to realize only a limited control action, while the principal task of avoiding the effects of the variations of the mechanical torque is realized by the modulation of the excitation current of the motor. This modulation can be realized in such a manner that the electromagnetic inertia of the motors inductor is taken into considered action and also that other causes of delays are considered as well; therefore there it is no longer necessary at the start of the control process to provide an initial deviation of the instantaneous value of the phase angle, in relation to its desired value.

Thus when there are periodical anticipatable variations of the mechanical torque applied at the end of the motors shaft, high efficiency can be realized by the combined action of the described two chains. In these cases, the chains acting on the modulation of the excitation current, reduces the deviation tendency of the controlled angle, while the control loop of the second chain, acting through the feed voltage of the motor armature avoids the imperfections of the modulation of the excitation current.

Thus it can be concluded that, by applying this combined action, there is no longer strictly necessary a too rigorous modulation of the excitation current, and the effects of eventual random variations of the mechanical torque are also attenuated.

If an anticipation of the mechanical torque variations can be obtained by the aid of detecting elements situated in a corresponding position then the necessary modulation can be obtained with the aid of these detecting elements, associated with transmitters and other logic elements, these transmitters being utilized instead of the function generator in the second chain.

If no anticipation of the mechanical torque variation is possible, the second chain may use only the modulation of the excitation current by the shown modalities, but maintaining the feedback loop of the angular-speed phase angle, this loop presenting the advantage that it acts through circuits with reduced inductance.

IT can be seen that if the reference vector of the phase angle is thus fixed on the motor rotor and that this phase angle is zero in the same time when the mechanical torque applied to the shaft is also zero, then the respective phase angle is nearly identical to the load angle of the motor, considered from a geometrical standpoint.

Figure 2:
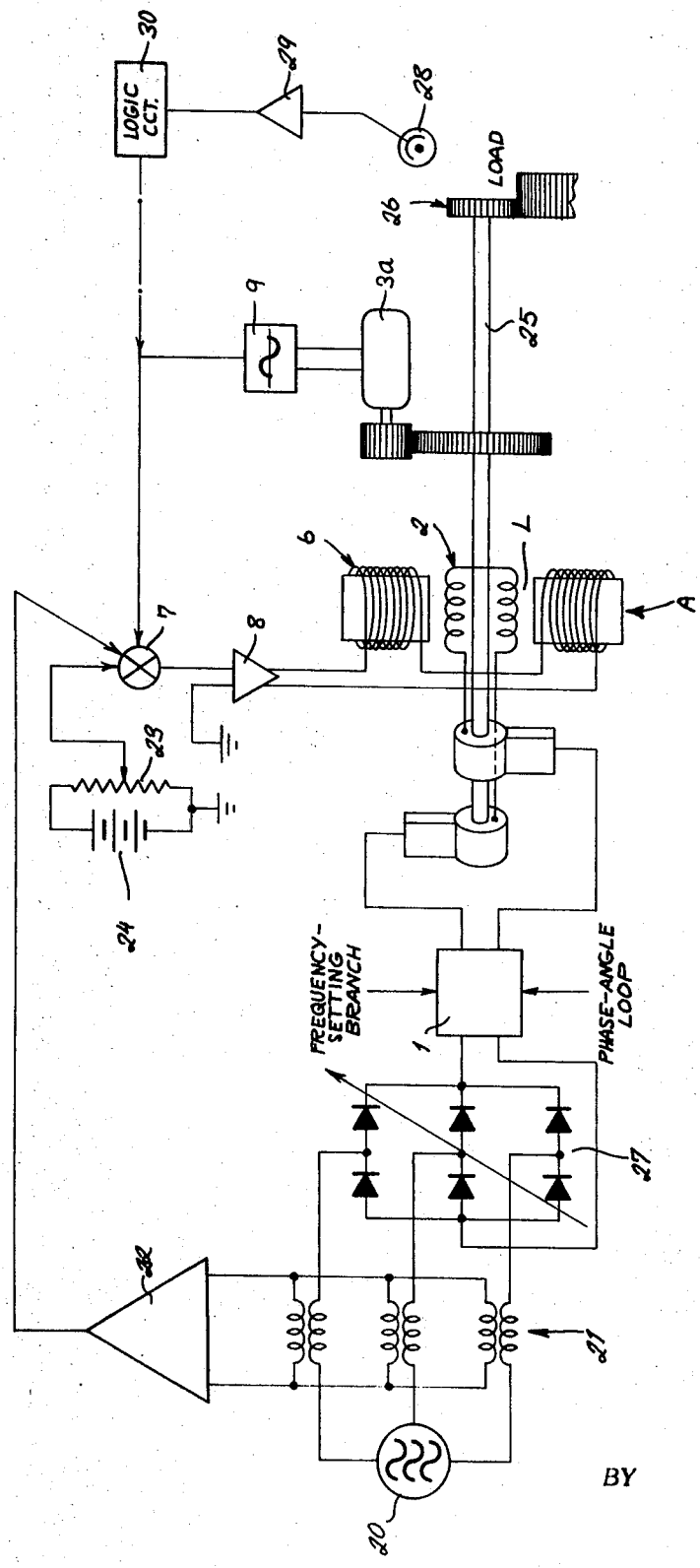

The above and other objects, features and advantages of the present invention will become more readily apparent from the following description, reference being made to the accompanying drawing, in which:

FIG. 1 is a block diagram an embodiment of the automatic control system proposed by this invention; and FIG. 2 is a diagrammatic illustration of other aspects of the system.

The phase-angle control chain, according to this invention, includes a thyristor inverter supplied with direct current from the local source and has a variable voltage level controlling the phase angle and a frequency regulating the motor speed. The frequency is determined by pulse-on and pulse-off time as established by a voltage/frequency and a voltage/duration converter coupled to the thyristor inverter while the voltage output of the inverter is a function of the level of the voltage input from the rectifiers feeding this inverter.

FIG. 1 represents, in block diagram form, an automatic-control system in accordance with the present invention. The waveforms of the signals at various points in the system are also illustrated with amplitude plotted along the ordinate against time as the abscissa.

Essentially, the system comprises a thyristor inverter 1 of the force-commutation type, e.g., as described at pages 226, 259 ff of the SCR MANUAL, Fourth Addition, General Electric Company, Syracuse, New York, 1967, the input $U_c$ of which is a direct current constant voltage $s_1$ as produced by a rectifier connected with noncontrolled silicon-rectifier diodes to the alternating current line.

Such an arrangement is diagrammatically illustrated at page 253 of the SCR MANUAL cited above.

The output of the rectifier is connected to the armature 2 of the synchronous electric motor represented generally at A and which is provided with a stator and stator windings (field coils) as represented generally at 6. A synchronous motor of this type is described at page 595 of the INTERNATIONAL DICTIONARY OF PHYSICS AND ELECTRONICS, Van Nostrand, New York, 1956 and at pages 15–67 to 15–69 of MARK'S MECHANICAL ENGINEERS' HANDBOOK, McGraw-Hill Book Company, New York, 1958.

A voltage/frequency signal converter 3 and a voltage/duration signal converter 4 are connected to the thyristor inverter 1 to provide the ignition and cutoff pulses of the latter. The voltage-frequency converter ensures the control of the spacing in time for starting (firing) the main thyristors of the inverter so that the output frequency is proportional to the value of the output of converter 3.

To the input of the voltage/frequency converter 3, I supply a reference frequency $f^*$ in the form of a direct current or constant voltage whose level represent the desired rotary speed of the motor. Hence, when $n$ represents the actual angular velocity of the motor or the rotary speed thereof, the value $n^*$ represents the desired angular velocity such that $n^*$ is proportional to $f^*$. The voltage/frequency converter, therefore, has an input representing the desired frequency and is constituted by an analog value whose level may control a chain of logical elements of conventional construction. Typical of such elements is a voltage-controlled oscillator, the output-frequency of which is determined by an applied reference voltage. A suitable voltage/frequency signal converter for the purposes of the present invention is the voltage-controlled Wien-bridge oscillator described in HANDBOOK OF SELECTED SEMICONDUCTOR CIRCUITS, U.S. Government Printing Office, Washington D.C., 1960. of course, a transducer, e.g., a tachometer as described at page 315 ff of SERVOMECHANISM PRACTICE, McGraw-Hill Book Company, 1960, may be used to respond to the motor velocity to generate the input $f^*$ or $n^*$ represented generally at $S_2$. The input is shown in solid lines at $s_2'$ to be constant, representing a constant motor speed or to be varied, e.g., manually as represented in dot-dash lines at $s_2''$, or to be fluctuating as shown at $s_2''$ in dotted lines as constituting a function of the actual motor speed $n$. The tachometer is represented at $3a$ and is shown to be coupled to the motor at $3b$ and has a continuous voltage (analog) output of an amplitude proportional to motor speed $n$. In general, however, the speed-indicating generator will deliver a digital signal.

The input of the voltage/duration converter 4 is represented as $\delta\alpha$ and is effectively an error signal produced by a comparator 5 which compares a reference input $\alpha^*$ with a measured value $\alpha$ of the phase angle of the angular speed of the motor. This converter insures control of conduction duration of the main thyristors of the inverter by delaying cutoff relative to triggering. The delay and, therefore, average value of inverter output is proportional to the input signal of the converter 4. The signals $\alpha$ and $\alpha^*$ are continuous (analog) voltages and the comparator 5 may be of the type described in SERVOMECHANISM PRACTICE, cited earlier. In the terms accepted in automatic control fields, the signal $\delta\alpha$ is the actuating signal, the signal $\alpha^*$ is the command signal and the signal $\alpha$ is a feedback signal. The signal $\alpha$ may derive from any conventional phase detector 5a (see pages 469–472 of SERVOMECHANISM PRACTICE). The converter 4 may be a blocking oscillator whose output pulses $s_3$ are delayed for a period $\Delta t$, relative to the corresponding nonretarded pulses $s_4$ of the voltage/frequency converter, the delay time $\Delta t$ being proportional to $\delta \alpha$. The nonretarded pulses $s_4$ and the retarded pulses $s_3$ serve respectively for the ignition and quenching of the poser thyristors of converter 1.

When the voltage/duration converter 4 is a blocking oscillator (see PULSE, DIGITAL AND SWITCHING WAVEFORMS, McGraw-Hill Book Company, New York, 1965), a trigger pulse may be supplied from the voltage/frequency converter and the delay controlled by the analog voltage $\delta \alpha$.

The summing point (summator) 7, providing the algebraic sum of its two inputs, and deriving an output signal $i_{ex}$, is connected to the inductor field 6 motor A by an amplifier 8, the signal $i_{ex}$ constituting a modulated excitation current for the motor. This modulated excitation current $i_{ex}$ is the algebraic sum of a signal $I_{ex}^*$ as delivered by an adjustable voltage source, i.e., a reference potentiometer, and represented as the signal $s_5$ of constant voltage. This voltage may be manually adjusted. The other input to the summator 7 is a value $[i_{ex} \approx]$ which is delivered by a function generator 9 capable of creating a desired waveform, e.g., a sine wave or sawtooth of a period determined by an input constituted as the annular speed $n$ of the motor from a transducer, e.g., the tachometer 3a. The output of the function generator 9 is represented at $S_6$ and has, as its 0 level, the time axis. As a result of the algebraic addition of the signals at 7, the output $i_{ex}$ can be represented at $S_7$. Hence, the function generator 9 imposes a fixed period (that of the basic sine wave or other fundamental of the function generator) upon the measured value of the angular speed of the motor.

The provisions of a summator at 7, according to the present invention, allows for modification of the input to the amplifier 8 and, therefore, the excitation current $i_{ex}$ in response to other parameters for which suitable networks may be provided and coupled to the summator 7. For example, I may provide a circuit for compensation of the effects of disturbances of industrial line voltages, etc.

In has been noted earlier that an important feature of this invention resides in the ability of the control system in the proper case to respond, possibly ahead of the particular occurrence, to changes in load torque. As shown in FIG. 2 diagrammatically, therefore, a monitoring device 28 is provided at the load 26 and is capable of sensing load changes which are manifested in terms of the input Ms of the system and may even be capable of observing condition $s$ which have been associated in the past with changes in the load torque. Where this is the case, the sensor 28 acts via an amplifier 29 and the logic circuitry and transmitter networks 30 upon the summator 7 in place of the signal generator 9. Typical of such a sensor is one which responds to the movement of a package or some other load onto a conveyor driven by the motor, the resistive torque increasing sharply once the package rests upon the conveyor. The logic circuitry may include a counter of memory with an output capable of establishing the potential loading change with time to provide an excitation-signal component accordingly.

The system of FIG. 1 can, therefore, be considered in terms of two distinct control chains. The first change includes the converter 1, the voltage/frequency signal converter 3 and the voltage/duration signal converter 4, as well as the comparator 5 and the phase-angle detector sa. This first control chain operates through the armature 2 of the motor and controls the on-and-off times of the inverter and thus the power pulses ($S_8$) applied to the motor. Looking at this control chain in totality, it will be seen that the input values are the load or resistive torque Ms (variable), the input direct current voltage $U_c$, the reference values $f^*$ or $n$ representing desired operating frequency and the reference value $\alpha^*$ representing desired phase-angel relationship. THese signals are all direct current or analog voltages while the output $\mu; f$ is a square wave of a polarity which may be alternating over an entire cycle, consisting of discrete pulses, The output quantities of the first control chain are the angular speed or velocity $n$ (equal to the angular velocity of the armature), the phase angle $\alpha$ and the mechanical torque generated by the motor shaft which, as noted, is part of the armature.

The second control chain, however, includes the summator 7, the amplifier 8, the function generator 9, the inductor 6 and through the interaction of the electromagnetic fields of the inductor and the armature 2, this armature and any measuring unit or rate meter responsive to the angular velocity $n$. The input values for this chain are the components $I_{ex}^*$ and $i_{ex} \approx$, constituted respectively by a DC (analog) input representing the desired level of the excitation current and a periodic signal whose fluctuations are a consequence of modulation in response to the actual angular velocity $n$.

The output quantities, of course, are the value $n$ of the angular velocity, the phase angle $\alpha$ and the torque Ma, thus the same output quantities as those of the first control chain. It will be immediately apparent, therefore, that the control chains are linked in the airgap between armature 2 and field elements 6 as represented at L and that the linkage is inductive.

The mean value of the angular velocity $n$ is given by the output frequency $f$ of inverter 1, while the phase angle $\alpha$ is given by the combined action of the output voltage or level $\mu$ of the inverter 1, the excitation current $i_{ex}$ and the mechanical torque or load Ms applied at the end of the shaft of motor A.

If the mechanical load torque Ms increases, the angular velocity $n$ tends to reduce, whereas the phase angle $\alpha$ tends to increase. If the excitation current $i_{ex}$ increases appropriately, with the increase commencing at an instant before the increase in mechanical torque, the tendency to variation of the angular speed and its phase angle are canceled. If the compensation is not perfect in point of time, the phase-angle control loop (5a, 5, 4), by increasing pulse on-time ensures an increase in the average voltage level $\mu$ per cycle tending to restore the initial values of $\alpha$ and $n$ with considerable rapidity. The two control chains, one for modulating excitation current and the other containing the control loop for the phase angle of angular velocity, operate reciprocally; the first contributing to the action of the second by modulating the excitation current while the second chain provides, via the phase-angle control loop, correction of imperfections in the action of the first chain. The second chain may be used alone if variations in load torque are excluded by other means. When the mechanical torque Ms diminishes, the above-mentioned processes are effective in the converse sense.

The automatic-control system of the present invention permits continuous variation of the rotating speed between wide limits simply by modifying the value of the signal $S_2$, the speed being no longer a function of the excitation current as is the case with direct current motors. Furthermore, the electrical elimination of kinematic problems permits use of the machine in a wide variety of applications, including operations with constant torque or with constant power over an entire range of speed variation. The weight and dimensions of the motor are reduced by comparison with those of a direct current motor of the same performance rating.

The modulation of the excitation current is compatible not only with the control of the phase angle of the motor speed but also with control of the armature current or the exchange of reactive power at the principal terminals. Since it is possible to reduce this exchange, inverters of larger power may be employed. The system has also been found to be useful for the synchronous and synphasic control of a number of motors provided along a common shaft, or motors which are synchronous and synphasic, but operate with different torques and adjustable speed at independent locations.

In FIG. 2, I have illustrated diagrammatically some elements of the invention which have not been shown in FIG. 1. Here the line-current source is represented at 20 as a three-phase AC line, each branch of which is provided with a current transformer 21 so that fluctuations may be amplified at 22 to constitute an input to the summator 7. In this embodiment, the voltage $I_{ex}$ is shown to derive from the potentiometer 23 in a voltage-divider circuit across a DC source 24. Also, the tachometer 3a is shown to be connected to the shaft 25 which derives the variable torque load 26. The adjustable-level rectifier bridge 27 provides the adjustable DC level $U_c$ feeding the inverter.

The synchronous motor used in accordance with the present invention can have its excitation winding either on the stator or rotor while the armature winding is placed upon the other. The inverter, according to the essentials of this invention, has independent cutoff so that it is possible to control the output frequency of the inverter totally independently of the synchronous motor fed thereby, i.e., independently of any relationship with the position of the rotor, the load angle or any other parameter of the motor.

I claim:

1. An automatic-control system for the angular velocity of a synchronous motor having a stator provided with an excitation winding and an armature provided with an armature winding electromagnetically coupled to the excitation winding in an airgap between stator and armature, said control system comprising:
   a forced commutation thyratron-type inverter connected with said armature winding;
   rectifier means supplying said inverter with a direct current power voltage;
   a first control chain connected to said armature winding and including:
      a voltage/frequency converter responsive to a continuous voltage for producing a chain of ignition pulses and connected with said inverter for rendering same conductive at a frequency determined by the voltage applied to said voltage/frequency converter,
      a voltage/duration converter responsive to an applied continuous voltage for generating a pulse train homologous with the pulses of said voltage/frequency converter but with a time delay determined by the level of the voltage applied to said voltage/duration converter, said pulse train being applied to said inverter to terminate conduction thereof, whereby said inverter applies to said armature winding pulses of a cadence determined by the voltage applied to the voltage/frequency converter and of a duration determined by the voltage applied to the voltage/duration converter, and
      feedback means responsive to the phase angle of angular velocity of said armature for producing a voltage proportional to deviation of said phase angle from a predetermined phase angle for controlling the delay time of said voltage/duration converter in a sense tending to eliminate said deviation; and
   a second control chain inductively coupled with said first control chain in said gap and including:
      a function generator coupled with said motor for generating a periodic signal whose period is controlled by a rotation speed of the motor,
      a source of a continuous excitation control voltage,
      summing means connected to said junction generator and said source of continuous excitation-control voltage for algebraically combining the outputs thereof and producing a modulated excitation current; and
   means for applying said modulated excitation current to said excitation winding.

2. The system defined in claim 1 wherein said means for applying said modulated excitation current to said excitation winding includes an amplifier connected between said summing means and said excitation winding.

3. The system defined in claim 1, wherein said feedback means comprises a phase-angle detector connected with said motor and producing an analog signal $\alpha$ representing the instantaneous value of said phase angle, a source of a continuous analog reference signal $\alpha^*$ representing an ideal phase angle, and a comparator responsive to said signals $\alpha$ and $\alpha^*$ for producing a continuous control voltage a and applying it to said inverter.

4. The system defined in claim 1 wherein said second chain includes means anticipatory of a change in mechanical torque applied to the motor shaft for controlling the excitation current.

5. The system defined in claim 1, further comprising means responsive to fluctuation in said direct current power voltage for producing a further signal forming an input to said summing means.

6. The system defined in claim 5 wherein said rectifier means is connected to an alternating current line source and said means responsive to fluctuation including a compensating circuit connected between said line source and said summing element.

7. A method of controlling the operation of a synchronous motor having an excitation coil and variable angular velocity from an alternating current line source, said method comprising the steps of:
   rectifying an alternating current input from said line source to produce a direct current;
   triggering a thyristor inverter with a train of pulses to connect the direct current to said motor during conductive periods of the thyristor inverter whereby said motor is driven at a rate determined by the frequency and duration of said pulses;
   deriving a first signal representing the phase angle of the angular velocity of the motor, detecting any deviation of the phase angle from a predetermined value established in accordance with the desired angular velocity of the engine, and controlling the duration of said pulses to minimize any deviation of the phase angle from said pr predetermined value; and
   detecting the angular velocity of said motor and producing a second signal proportional thereto, comparing said second signal with a predetermined value representing the desired motor speed and producing an output representing deviation of the angular velocity of said motor from the predetermined value, generating an excitation current, and applying said excitation current of said motor to said excitation coil while modulating the excitation current with said output representing deviation of said angular velocity.

8. The method defined in claim 7, further comprising the steps of:
   deriving a third signal representing the output frequency of said inverter, comparing the third signal with a reference and controlling the frequency of said pulses in accordance with the comparison of the third signal with said reference.

9. An automatic control apparatus for a synchronous motor having an excitation coil and armature using a source of direct current, said apparatus comprising:
   a thyristor inverter connected with said source and an output connected with said armature for delivering a train of power pulses to said armature to drive said motor synchronously with the frequency of said pulses;
   a voltage and duration converter and a frequency-determining converter connected to said inverter for triggering the thyristors thereof with predetermined conduction duration and frequency to form said pulses therein;
   means connected with said motor for determining the phase angle of said motor for operating said duration converter to regulate the duration of said pulses to maintain a predetermined phase-angle relationship;
   a function generator for producing an excitation-current waveform connected to said excitation coil; and
   means responsive to the angular velocity of said output of said function generator to modulate said excitation signal.

10. The apparatus defined in claim 9 wherein said function generator includes a summing component, further comprising means responsive to a parameter of operation of said motor and connecting to said summing component for modifying said excitation current to compensate for changes in said parameter.